United States Patent [19]
Fischer

[11] Patent Number: 4,652,184
[45] Date of Patent: Mar. 24, 1987

[54] FASTENING ARRANGEMENT FOR FASTENING A DRILL BELL

[76] Inventor: Artur Fischer, Weinhalde 34, D-7244 Waldachtal 3/Tumlingen, Fed. Rep. of Germany

[21] Appl. No.: 807,436

[22] Filed: Dec. 9, 1985

[30] Foreign Application Priority Data

Dec. 11, 1984 [DE] Fed. Rep. of Germany ....... 3445075

[51] Int. Cl.⁴ ........................ B23Q 11/02; B23B 47/00

[52] U.S. Cl. ........................................ 408/67; 175/209; 409/137

[58] Field of Search ............... 175/207, 209, 210, 211, 175/217; 123/32, 33; 51/273; 408/67, 76, 111, 241 S, 237, 14; 144/252 R; 403/299, 343; 409/137

[56] References Cited

U.S. PATENT DOCUMENTS 1,930,099 10/1933 Kelley .................................. 175/209
3,837,383 9/1974 Ko ...................................... 408/67 X
3,942,411 3/1976 Gerber ................................ 409/137
4,250,971 2/1981 Reibetanz et al. .............. 175/209 X

FOREIGN PATENT DOCUMENTS 579564 6/1933 Fed. Rep. of Germany ...... 403/299
2618595 11/1977 Fed. Rep. of Germany .
2940362 4/1981 Fed. Rep. of Germany ........ 408/67
3113496 10/1982 Fed. Rep. of Germany .
3324615 5/1984 Fed. Rep. of Germany .
113325 1/1926 Switzerland ........................ 403/299

*Primary Examiner*—Stephen J. Novosad
*Assistant Examiner*—David J. Bagnell
*Attorney, Agent, or Firm*—Michael J. Striker

[57] ABSTRACT

A fastening arrangement for a drill bell and/or suction bell provided on drills which have a stop rod mounted to the drill that it may be displaced or rigidly fixed, may be adapted to any drill equipped with the stop rod is suggested. The fastening arrangement comprises a U-shaped support which projects radially from the bell and opens towards the wall of the structure being drilled and in its base has an elongate hole. The bell may be fixed to the U-shaped support by means of a clamping member joined to the stop rod and to the U-shaped support, respectively.

4 Claims, 2 Drawing Figures

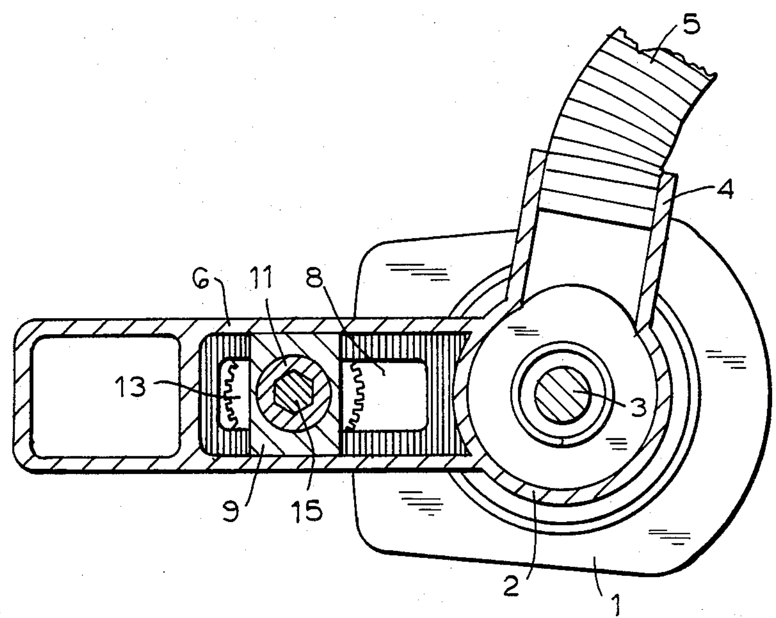
F I G. 2

FASTENING ARRANGEMENT FOR FASTENING A DRILL BELL

BACKGROUND OF THE INVENTION

The present invention relates to a fastening arrangement for a drill bell and/or suction bell provided on drills, which have a stop rod mounted on the drill so that it may be displaced or rigidly fixed.

One of the fastening devices of the foregoing type has been disclosed in applicant's U.S. Pat. No. 4,372,401.

Suction devices are also known, which are equipped with a rod-shaped extension and which can be fastened to the drill by means of a collar, which is provided for the mounting of a stop rod, or by mcans of a lateral hand grip. Such fastening arrangements are, generally speaking, only suitable for one type of a drill, because the distance from the guide means for holding the extension and located in the collar or in the hand grip to the middle of the drill bell and/or suction bell is different in different types of drills.

SUMMARY OF THE INVENTION

It is an object of the present invention to provide a fastening arrangement for a drill bell and/or suction bell which may be adapted to any drill provided with a stop rod.

This and other objects of the invention are attained by a fastening arrangement for fastening a bell surrounding a drill at a face of a structure being drilled, which drill is porvided with a stop rod mounted to the drill so that it can be displaced axially thereof and rigidly connected thereto, the arrangement comprising a U-shaped support projecting outwardly radially from the bell and opening towards the face of the structure being drilled said support having a base formed with an elongated hole; and a clamping member receiving an end of the stop rod and connected thereto and also connected to said support.

The invention enables the stop rod customarily present on all drills to be used for the mounting of drill bells and/or suction bells. Different distances between the stop rod and the axis of the drilling tool may be adjusted by displacing the clamping member connected to the stop rod on the radially projecting U-shaped support of the bell.

The fastening arrangement according to the invention makes it possible that the drill bell and/or suction bell to be secured to any drill equipped with a stop rod. The radially projecting support simultaneously serves as an additional bearing surface on a wall of the structure being drilled; this bearing surface ensures the right-angled alignment of the drill.

The clamping member may include an outer part fixed in said support and an inner part receiving said end, said outer and inner part being screwed to each other so as to clamp the base of said support therebetween. Because the inner and outer parts are screwed together, displacement and fixing are easy to make.

The outer part of said clamping member may be inserted into said support and having an end face provided with locking edges, said base having an inner face also provided with locking ridges meshing with the locking edges of said outer part. The meshing locking ridges prevent an unintentional shifting of the clamping member on the U-shaped support even when the drill vibrates strongly.

The inner part of the clamping member may have a recess matching a cross-section of said stop rod to receive the end of the latter. Generally, the stop rods on drills are hexagonal or round rods. If the recess is of suitable shape, both kinds of rod cross-section can be pressed into the recess of the top part of the clamping piece. When the stop rods are very different, the inner part of the clamping member may be replaced with a suitable one.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 2 is a sectional view of the fastening arrangement, taken along line II—II of FIG. 1.

DETAILED DESCRIPTION OF THE PREFERRED EMBODIMENT

Figure 1:
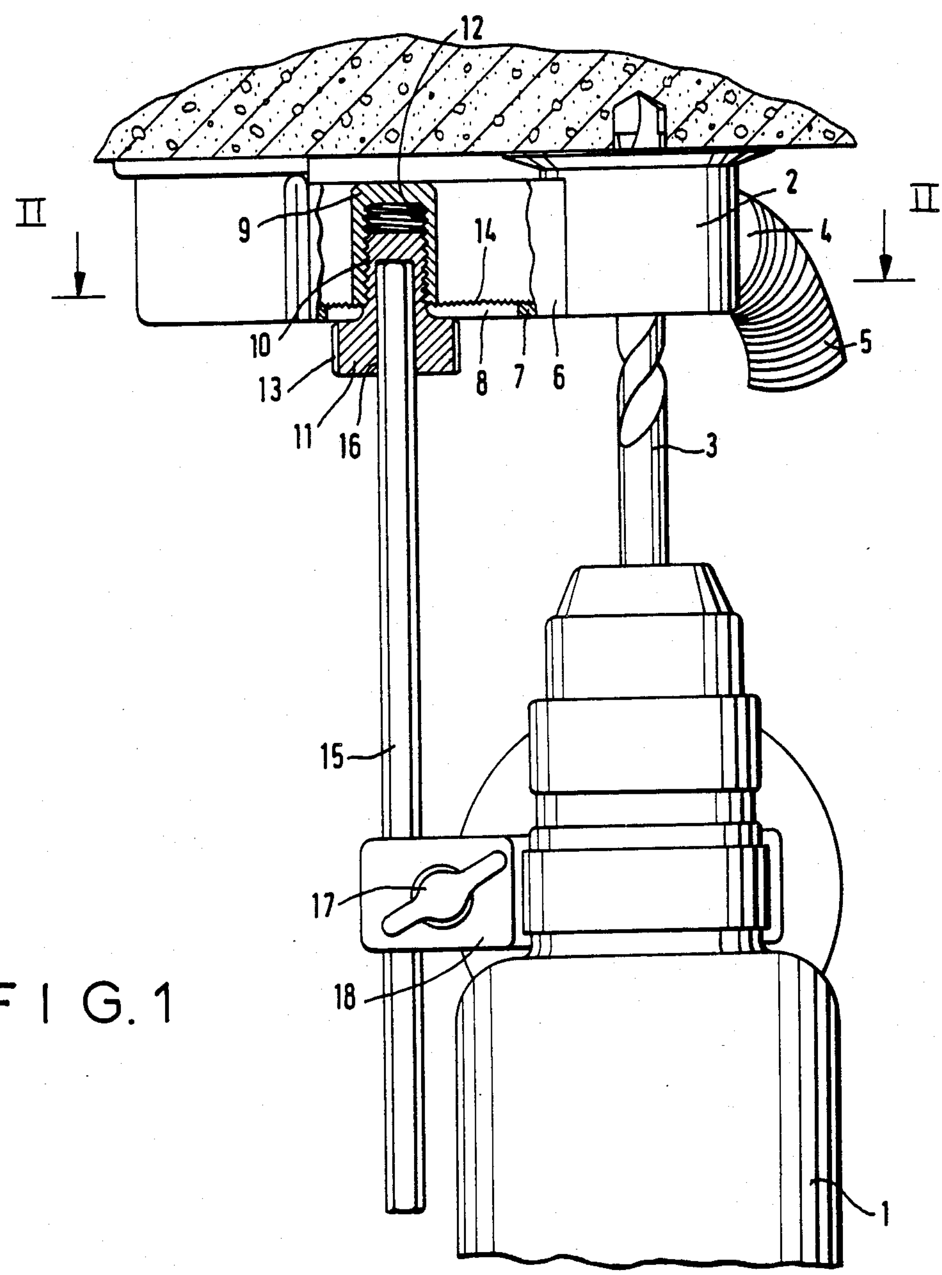
FIG. 1 of the drawing is a side view, partially in section, of a fastening arrangement according to the invention

Referring now to the drawing in detail, reference numeral 1 designates a drill for making holes in, for example a wall or concrete structure 20. Drill 1 carries a drilling tool 3 which extends through a suction device fastened to the drill 1. Reference numeral 15 designates a stop rod which can be axially displaced relative to the tool 3 or be rigidly fixed relative to the drill. The suction device comprises a cylindrical suction head 2 which is pulled over the drilling tool chucked in the drill. A radially extending connection element 4 which can be joined to a suction blower by a flexible hose 5 opens into the suction head 2. For supporting the suction head, a U-shaped support, which extends radially from the suction head, is provided on the suction head. U-shaped support 6 opens towards the wall 20 and has a base 7 formed with an elongated hole 8. The U-shaped support 6 receives a two-part clamping member which in turn receives the end of the stop rod 15. The two part clamping member includes an outer element 9 inserted at the open side of the support 6 and an inner element 11 which projects into the support 6 through the elongated hole 8 in its base 7. The width of the outer element 9 corresponds to the distance between two parallel arms of the U-shaped support 6. The inner element 11 is provided with an external thread 10 screwed into the corresponding internal thread 12 formed in the outer element 9 such that the base 7 is clamped between the outer and inner elements of the clamping piece due to the provision of a head 13 on the inner element 9, which head has a face abutting against the end face of the base 7 in assembly.

In order to screw two elements 9 and 11 of the clamping member together the head 13 of element 11 is formed as a knurled rotating knob. To improve the fixing of the clamping piece, both the inner face of the base 7 of the U-shaped support 6 and the end face of the outer element 9 are provided with meshing locking ridges 14. By using the clamping member, differences in the distance between stop rod 15 and the drill bit axis can be so compensated that the drill tool or bit 3 runs exactly centrally in the suction head 2. The suction head 2 is connected to the drill 1 by stop rod 15 which is pressed into a seat 16 of the element 11 of the clamping member. In the exemplified embodiment the stop rod 15 is fastened to a lateral hand grip 18 of the drill 1 by means of a clamping screw 17.

The proposed type of mounting is suitable for all devices that have to be arranged in alignment with the tool axis. This mounting is especially advantageous also for drills that are used for drilling undercut drill holes. With such drills, under some circumstances a turning moment acting on the drill through the drilling tool occurs, and this turning moment is also absorbed by the mounting according to the invention.

It will be understood that each of the elements described above, or two or more together, may also find a useful application in other types of fastening assemblies for fastening drill bells differing from the types described above.

While the invention has been illustrated and described as embodied in a fastening assemblies for fastening drill bells, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims; I claim:

1. A fastening arrangement for fastening bell surrounding a drill at a face of a structure being drilled, which drill is provided with a stop rod mounted to the drill so that it can be displaced axially thereof and rigidly connected thereto, the arrangement comprising a U-shaped support projecting outwardly radially from the bell and having a side opening towards the face of the structure being drilled and a base formed with an elongated hole; and a clamping member connected to the stop rod and also connected to said support, said clamping member including an outer part inserted into said support at said side and fixed in said support, and an inner part inserted into said support at said base and receiving an end of said stop rod to hold the latter and having a threaded portion screwed into said inner part, and a head abutting against said base which is clamped between said outer part and said head, whereby distances between the stop rod and an axis of the drill are adjustable by displacing the clamping member, connected to the stop rod, on said support.

2. The arrangement as defined in claim 1, wherein said outer part of said clamping member has an end face provided with locking edges, said base having an inner face alos provided with locking ridges engaged with the locking edges of said outer part.

3. The arrangement as defined in claim 1, wherein said inner part has a recess matching a cross-section of said stop rod to receive the end of the latter.

4. The arrangement as defined in claim 1, wherein said head is knurled.

* * * * *